US008997387B2

(12) United States Patent
Oki

(10) Patent No.: US 8,997,387 B2
(45) Date of Patent: Apr. 7, 2015

(54) LIGHT GUIDE PLATE HAVING DIFFUSED LIGHT PRINTED DOT PATTERN

(75) Inventor: Koji Oki, Hyogo (JP)

(73) Assignee: Hayamizu Denki Kogyo KabushikiKaisha, Hyogo (JP)

( * ) Notice: Subject to any disclaimer, the term of this patent is extended or adjusted under 35 U.S.C. 154(b) by 0 days.

(21) Appl. No.: 13/381,088

(22) PCT Filed: Jun. 24, 2009

(86) PCT No.: PCT/JP2009/061487
§ 371 (c)(1),
(2), (4) Date: Dec. 28, 2011

(87) PCT Pub. No.: WO2010/150364
PCT Pub. Date: Dec. 29, 2010

(65) Prior Publication Data
US 2012/0102798 A1 May 3, 2012

(51) Int. Cl.
G06F 13/18 (2006.01)
F21V 8/00 (2006.01)
G09F 13/18 (2006.01)
F21Y 101/02 (2006.01)
F21Y 105/00 (2006.01)

(52) U.S. Cl.
CPC ........... *G02B 6/0043* (2013.01); *F21Y 2101/02* (2013.01); *F21Y 2105/00* (2013.01); *G02B 6/006* (2013.01); *G09F 13/18* (2013.01)

(58) Field of Classification Search
CPC ...................................... G09F 13/18
USPC ......................................... 40/546
See application file for complete search history.

(56) References Cited

U.S. PATENT DOCUMENTS

| 5,027,258 A * | 6/1991 | Schoniger et al. ............ 362/629 |
| 5,273,796 A * | 12/1993 | Elbing et al. .................... 428/29 |
| 5,407,711 A * | 4/1995 | Lovison et al. ................. 428/13 |
| 6,991,359 B2 * | 1/2006 | Leu et al. ........................ 362/624 |
| 2007/0124970 A1 * | 6/2007 | Hjaltason ........................ 40/546 |
| 2009/0100727 A1 * | 4/2009 | Chen .............................. 40/546 |

FOREIGN PATENT DOCUMENTS

| CN | 2594812 Y | 12/2003 |
| CN | 1510487 A | 7/2004 |
| JP | H01-139286 U | 9/1989 |
| JP | 8-160892 A | 6/1996 |
| JP | H10-69244 A | 3/1998 |
| JP | 3052358 U | 9/1998 |

(Continued)

OTHER PUBLICATIONS

International Search Report for PCT/JP2009/061487 dated Sep. 29, 2009, pp. 1-2.

*Primary Examiner* — Joanne Silbermann
(74) *Attorney, Agent, or Firm* — Ditthavong & Steiner, P.C.

(57) ABSTRACT

The lighting apparatus 10 includes a light guide plate 11 made of a transparent material and having a pair of faces 12a, 12b opposing each other and an end face adjoining the faces, a silkscreen-printed dot pattern 13 used to diffuse light, provided only on the face 12a of the light guide plate 11 and formed with a special ink, and an LED light source 20 disposed so as to face the end face of the light guide plate 11. The face 12a of the light guide plate 11 provided with the silkscreen-printed pattern 13 serves, as it is, as a light-emitting surface.

8 Claims, 3 Drawing Sheets

(56) References Cited

FOREIGN PATENT DOCUMENTS

| JP | 2001-005417 A | 1/2001 |
|---|---|---|
| JP | 2002-228847 A | 8/2002 |
| JP | 2005-116432 A | 4/2005 |
| JP | 2005292490 A | 10/2005 |
| JP | 2007-080531 A | 3/2007 |
| JP | 2007-141735 A | 6/2007 |
| JP | 2009-000903 A | 1/2009 |
| JP | 2009026708 A | 2/2009 |
| JP | 2009-47909 A | 3/2009 |

* cited by examiner

LIGHT GUIDE PLATE HAVING DIFFUSED LIGHT PRINTED DOT PATTERN

TECHNICAL FIELD

This invention relates to a lighting apparatus, and in particular to a light-transmissive lighting apparatus.

BACKGROUND ART

Conventional lighting apparatuses are disclosed in, for example, Japanese Unexamined Patent Application Publication No. 2007-141735 (hereinafter, referred to as "PL 1"), Japanese Unexamined Patent Application Publication No. 2007-80531 (hereinafter, referred to as "PL 2") and Japanese Unexamined Patent Application Publication No. 1996(H08)-160892 (hereinafter, referred to as "PL 3").

PL 1 discloses a double-sided light-emitting panel including a light guide plate having a plurality of plasma lamps arranged on end side surfaces thereof, transparent acrylic plates disposed on both surfaces of the light guide plate, and advertising media disposed on the acrylic plates. For the light guide plate, a very clear transparent substrate is used that is made of polymethylmethacrylate, (meth) acrylic acid ester copolymer, polycarbonate, polystyrene, polyvinyl chloride or glass, with a light-diffusing material, such as a transparent or white pigment, mixed in the substrate material.

PL 2 discloses an LED lighting fixture including a light guide plate having an incident surface on one side thereof and an LED arranged so that the direction that the a light-emitting surface faces roughly intersects with the direction that the incident surface faces. This light guide plate is made of a light-transmissive material, such as glass and acrylic.

PL 3 discloses a structure including a light guide plate, which is a light-transmissive plate made of acrylic resin or the like, LEDs arranged on one side of the light guide plate, and dot-patterned light-emitting layers that are provided on surfaces of the light guide plate and emit light outward at an increasing rate while increasing the distance from the LEDs. In the structure, light from the LEDs is once uniformly applied over the entire pattern display portion of the light guide plate and then unnecessary light for the patterns of characters and design depicted on the pattern filter on the light-emitting layer returns into the light guide plate to allow the required characters and design to emerge on the surface.

CITATION LIST

Patent Literature

[PL 1] JP-A No. 2007-141735
[PL 2] JP-A No. 2007-80531
[PL 3] JP-A No. 1996(H08)-160892

SUMMARY OF INVENTION

Technical Problem

Conventional lighting apparatuses are configured as described above. The lighting apparatus of PL 1 employs a substrate with a high degree of transparency; however, the transparent or white pigment mixed as a light-diffusing material in the substrate material may cause luminance nonuniformity over the entire surface of the light guide plate and also may degrade the light transmittance of the lighting apparatus in operation.

Since the light guide plate of PL 2 is provided with a reflection sheet on one side thereof, the lighting apparatus has low light transmittance.

The pattern films provided on the light-emitting layers also degrade the light transmittance of the light guide plate of PL 3.

The present invention has been made to solve the aforementioned problems and has an object to provide a lighting apparatus with sufficient light transmittance.

Solution to Problem

The lighting apparatus according to the present invention includes a light guide plate made of a transparent material and having a pair of faces opposing each other and an end face adjoining the faces, a silkscreen-printed dot pattern used to diffuse light, the pattern provided only on one face of the pair of faces of the light guide plate and formed with a special ink, and a light source disposed so as to face the end face of the light guide plate. The face of the light guide plate provided with the silkscreen-printed pattern serves, as it is, as a light-emitting surface on one side of the light guide plate.

Preferably, the silkscreen-printed pattern is provided only on a part of the light guide plate.

More preferably, the printed pattern is provided only on a part at the center of the light guide plate.

The light guide plate can have a curve.

The silkscreen-printed pattern can be in a predetermined shape.

The light source is preferably an LED.

The light guide plate can be made of acrylic or white glass.

Advantageous Effects of Invention

The lighting apparatus according to the present invention includes a light guide plate of transparent material and a silkscreen-printed dot pattern formed on only one surface of the light guide plate with special ink to thereby maintain the uniform brightness of the whole light guide plate. The surface of the light guide plate with the silkscreen-printed pattern formed thereon serves, as it is, as a light-emitting surface on one surface side of the light guide plate to thereby allow light from the light source to diffuse through the light guide plate with sufficient light transmittance.

In conclusion, a sufficiently light-transmissive lighting apparatus can be provided.

DESCRIPTION OF EMBODIMENTS

Figure 1:
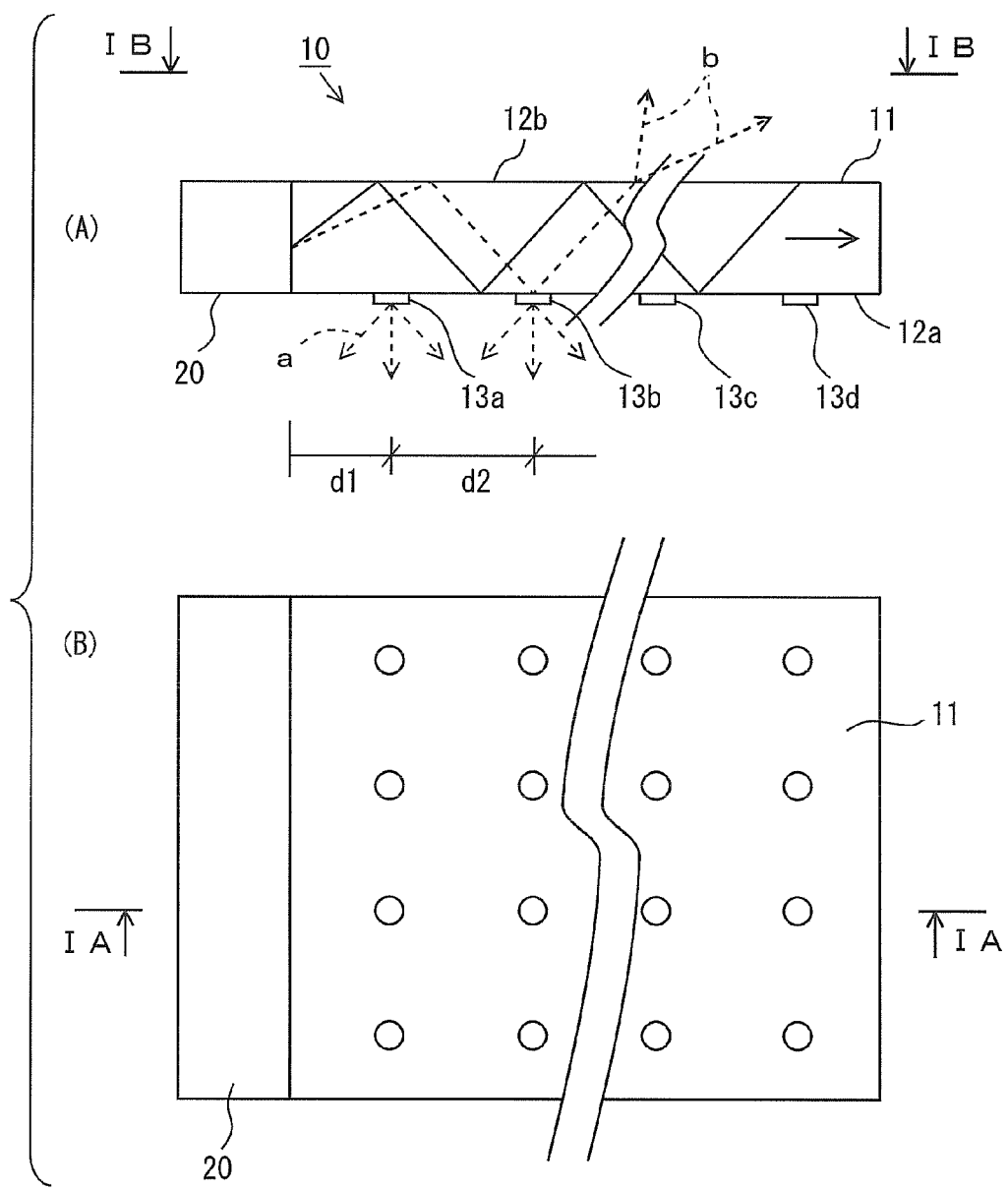
FIG. 1 illustrates a lighting apparatus according to an embodiment of the invention.

With reference to the drawing, an embodiment of the present invention will be described below. FIG. 1 shows a lighting apparatus 10 according to the embodiment of the invention. FIG. 1(A) is a cross-sectional view of the lighting apparatus 10 (taken along arrows IA-IA in FIG. 1(B)), while FIG. 1(B) is a view along arrow IB-IB in FIG. 1(A).

Referring to FIG. 1, the lighting apparatus 10 includes a light guide plate 11 that is a light-transmissive rectangle glass or acrylic plate and has a face 12a and a face 12b opposite to the face 12a, dots (a silkscreen-printed dot pattern) 13a to 13d printed on the face 12a of the light guide plate 11 with a special ink, and an LED light source 20 disposed on an end face of the light guide plate 11 so as to face the light guide plate 11, the end face adjoining the face 12a and opposing face 12b of the light guide plate 11.

The dot pattern 13 is formed to scatter light that has entered the dots toward the outside. Specifically, light applied from the LED light source 20 to the light guide plate 11 is reflected on the faces 12a and 12b of the light guide plate 11 and propagates in the direction indicated by arrows in FIG. 1(A). At this point, the light incident into the dot pattern 13 is scattered outward from the dots (indicated with dotted lines a in FIG. 1(A)). In other words, the light is emitted out from the position where the dot pattern 13 is provided. In addition, a part of the light incident into the dot pattern 13 is emitted out through the face 12b as shown by dotted lines b in FIG. 1(A).

If the light guide plate 11 extends far away from the light source 20, the dot pattern 13 is designed so that spaces d1, d2, . . . are defined as d1<d2<d3< . . . . The dot pattern 13 thus designed allows illumination of both faces of the light guide plate 11, from the light source 20 to a distant position, with a uniform amount of light.

In this embodiment, the dot pattern 13 is formed only on the face 12a; however, the dot pattern can be formed also on the face 12b. This structure can increase the amount of light emitted from both faces, thereby providing a brighter lighting apparatus 10.

Note that the light source 20 includes a plurality of LEDs arranged along the longitudinal direction (i.e., the vertical direction in FIG. 1 (B)) of the light source 20.

In this embodiment, the LED light source 20 is disposed so as to face a single end face of the light guide plate 11; however, the present invention is not limited thereto and the LED light source can be disposed so as to face a plurality of end faces.

In the lighting apparatus 10 according to the embodiment, the light guide plate 11 for emitting light and the printed shield 13 are made of a light-transmissive material, such as glass and acrylic plate, dots 13a, 13b, . . . are printed only on the face 12a with a special ink, and the face provided with the dots 13a, 13b, . . . serves itself as a light-emitting surface. Such a lighting apparatus 10 achieves surface light emission with one face and the other face and also has light transmissive properties.

A light transmissive lighting apparatus 10 can be consequently provided.

If glass is used as the light guide plate 11, white glass is preferable because it has less impurity, an excellent light transmittance and a high degree of transparency.

Figure 2:
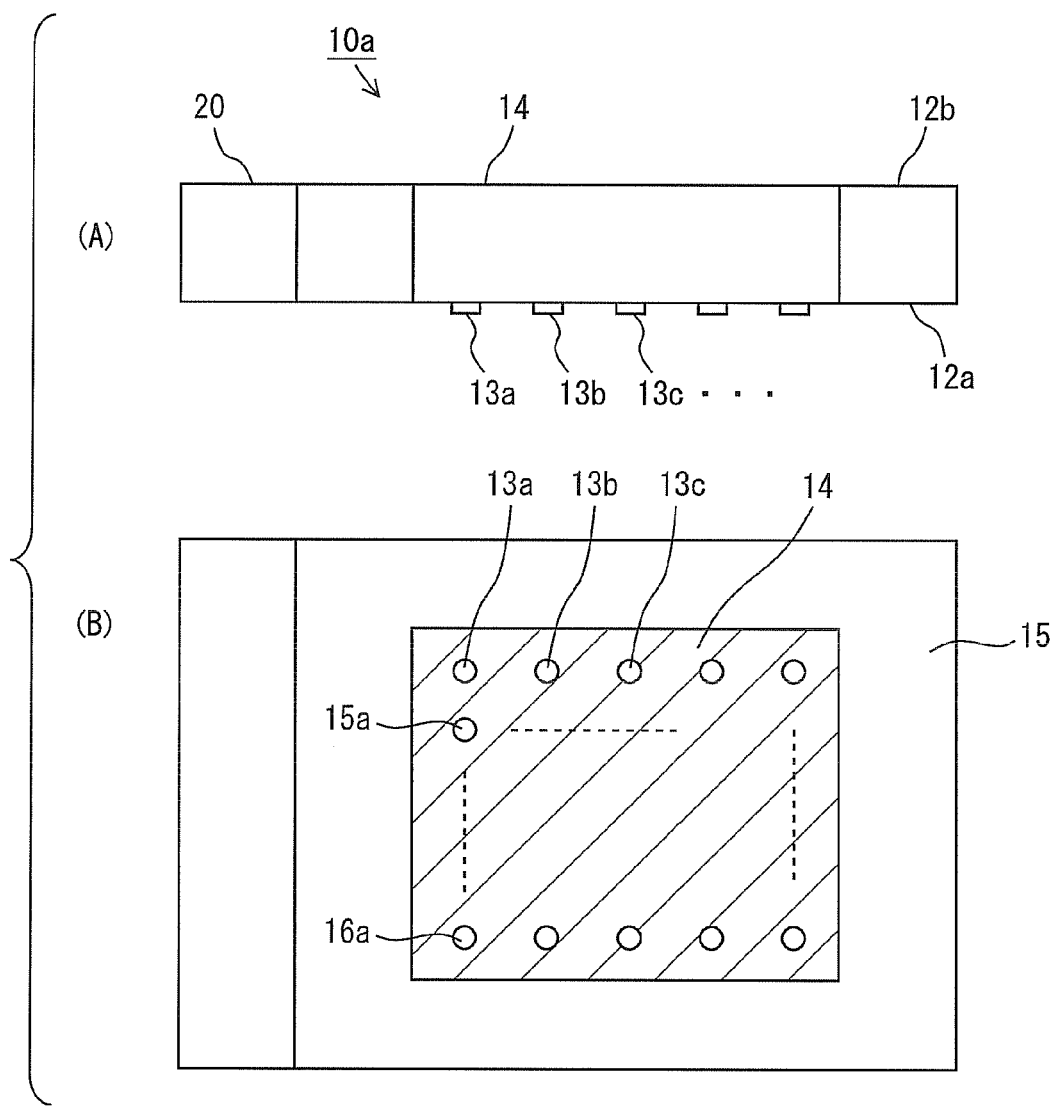
FIG. 2 illustrates a lighting apparatus according to another embodiment of the invention.

Another embodiment of the present invention will be described. FIG. 2 shows a lighting apparatus 10a according to the embodiment of the invention. FIG. 2(A) and FIG. 2(B) correspond respectively to FIG. 1(A) and FIG. 1(B) in the previous embodiment.

Referring to FIGS. 2(A) and 2(B), this embodiment is different from the embodiment of FIG. 1 in that the dot pattern 13 is confined within an illuminating area 14. Specifically, the illuminating area of the previous embodiment extends across the whole lighting apparatus 10; however, the illuminating area 14 in the present embodiment is provided only in the center of the lighting apparatus 10a and surrounded by a transparent area 15. Other than that, this embodiment is the same as the previous embodiment, and therefore the corresponding components to those in FIG. 1 are denoted by the same numerals as of FIG. 1 and will not be further explained.

In the lighting apparatus 10a thus structured, the entire light guide plate 11 is not used as a lighting apparatus, but only the illuminating area 14 provided with a dot pattern can be used as an area that can emit light and the other area can remain as a transparent area. Note that the illuminating area 14 can be provided not only in the center of the light guide plate 11, but also at any part of the light guide plate 11.

Figure 3:
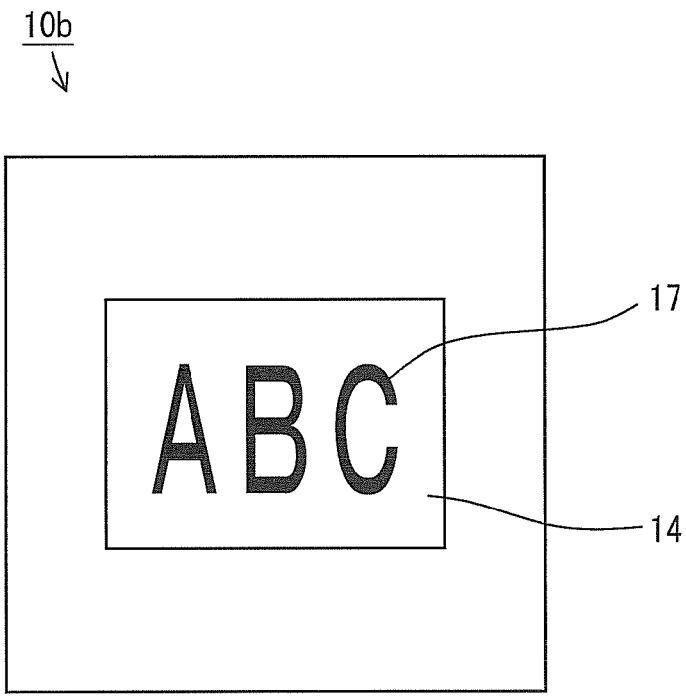
FIG. 3 illustrates a lighting apparatus according to yet another embodiment of the present invention.

In addition, the lighting apparatus 10a in itself can be used as an advertising apparatus by transforming the illuminating area 14 into specific characters or shapes. FIG. 3, which corresponds to FIG. 2(B), shows the structure with the transformed illuminating area. Referring to FIG. 3, in the embodiment, specific advertising characters (ABC) 17 are displayed in the illuminating area 14.

The advertising display with the advertising characters 17 can be achieved by causing the whole advertisement to emit light or by causing the only desired parts of the advertisement to emit light, or by shaping the dot pattern into the advertising display or by putting a desired advertising display over the illuminating area 14.

Figure 4:
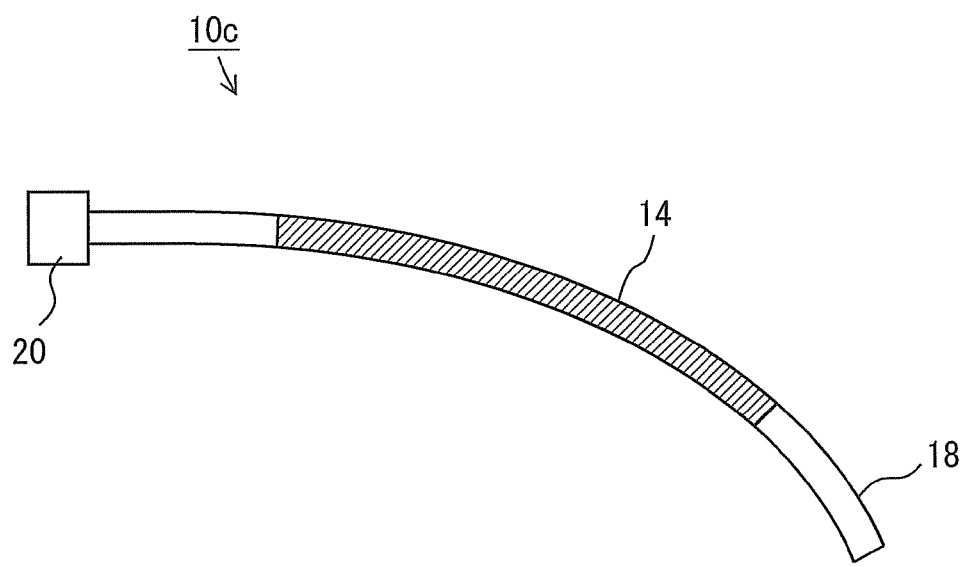
FIG. 4 illustrates a lighting apparatus according to yet another embodiment of the present invention.

Yet another embodiment of the present invention will be described. FIG. 4 illustrates the embodiment of the present invention and corresponds to FIG. 2(A) of the previous embodiment. As shown in FIG. 4, the lighting apparatus 10c in the present embodiment includes a light guide plate 18 with a curve. Because the light guide plate 18 has a curve, the illuminating area 14 also has a curve.

The lighting apparatus 10c thus designed can be provided as an advertising apparatus having curved areas. In addition, combining the lighting apparatuses shown in FIGS. 1, 2 and 4 can provide a lighting apparatus in any desired shapes with curved and flat areas.

The above-described embodiments use LEDs for a light source; however, the present invention is not limited thereto and can use fluorescent lamps, cold-cathode tubes or the like as the light source.

In addition, a plurality of the lighting apparatuses can be combined to make a large lighting apparatus or a lighting apparatus for displaying desired advertisement.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents.

INDUSTRIAL APPLICABILITY

The light-transmissive lighting apparatus according to the invention is advantageously used as a lighting apparatus.

REFERENCE SIGNS LIST

10: lighting apparatus
11: light guide plate
12a: face
12b: face
13: dot pattern
14: illuminating area
15: transparent area
20: LED light source

The invention claimed is:

1. A lighting apparatus comprising:
   a light guide plate made of a transparent material and having a pair of faces opposing each other and an end face adjoining the faces;
   a silkscreen-printed dot pattern used to diffuse light, the pattern provided only on one face of the pair of faces of the light guide plate and formed with a special ink; and
   a light source disposed so as to face the end face of the light guide plate, wherein
   the face of the light guide plate provided with the silkscreen-printed pattern serves, as it is, as a light-emitting surface on one side of the light guide plate, without any other members provided thereon, and
   the lighting apparatus is configured so that a light from the light source is applied to the light guide plate and is reflected on both faces of the light guide plate and the light incident into the dot pattern is scattered outward on both sides of the light guide plate from the dots, while the light transmits through the light guide plate.

2. The lighting apparatus according to claim 1, wherein the silkscreen-printed pattern is provided only on a part of the light guide plate.

3. The lighting apparatus according to claim 2, wherein the silkscreen-printed pattern to be provided only on a part of the light guide plate is provided in the center of the light guide plate.

4. The lighting apparatus according to claim 1, wherein the light guide plate has a curve.

5. The lighting apparatus according to claim 1, wherein the silkscreen-printed pattern is an advertising display.

6. The lighting apparatus according to claim 1, wherein the light source is an LED.

7. The lighting apparatus according to claim 1, wherein the light guide plate is made of acrylic.

8. The lighting apparatus according to claim 1, wherein the light guide plate is made of white glass.

* * * * *